(No Model.)
G. B. BAYLEY.
BROODER FOR CHICKENS.
No. 330,547. Patented Nov. 17, 1885.
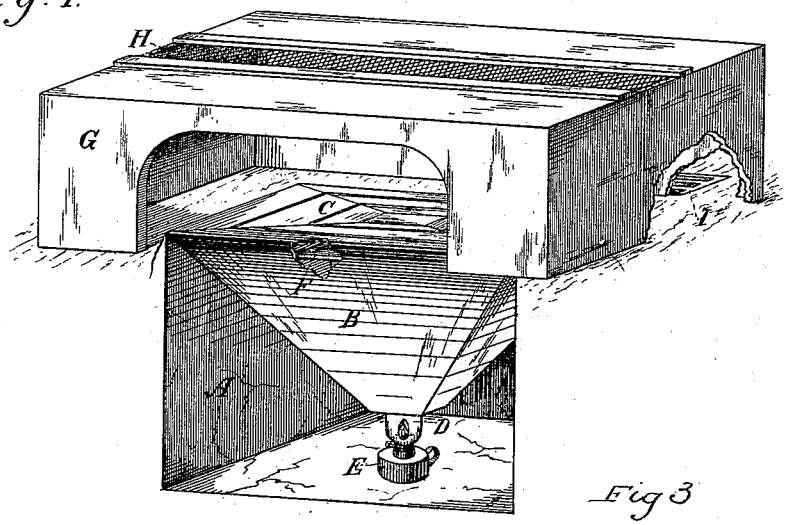
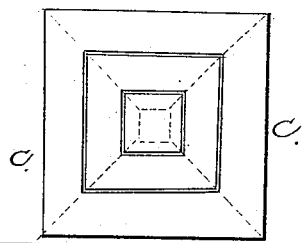
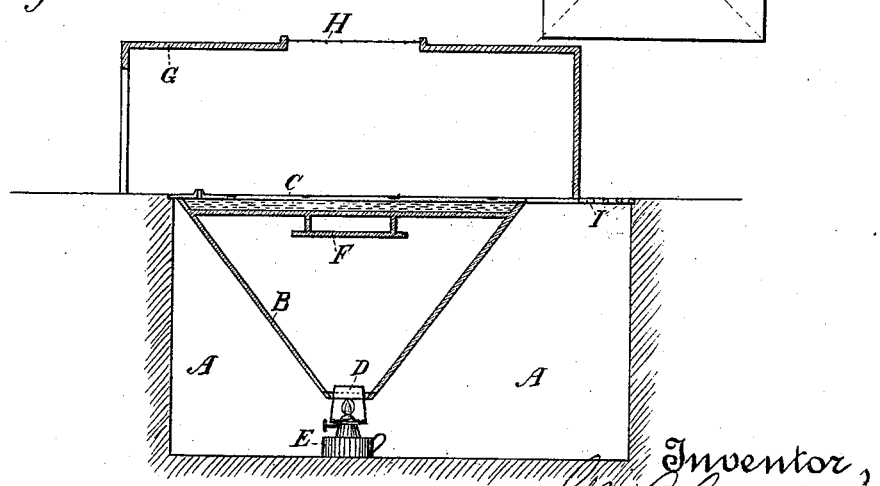

UNITED STATES PATENT OFFICE.

GEORGE B. BAYLEY, OF OAKLAND, CALIFORNIA.

BROODER FOR CHICKENS.

SPECIFICATION forming part of Letters Patent No. 330,547, dated November 17, 1885.

Application filed November 20, 1884. Serial No. 148,455. (No model.)

*To all whom it may concern:*

Be it known that I, GEORGE B. BAYLEY, of Oakland, county of Alameda, State of California, have invented an Improvement in Brooders for Chickens; and I hereby declare the following to be a full, clear, and exact description thereof.

My invention relates to brooders for the care of young chickens; and it consists in a means for supplying a requisite and equable temperature, and a space where the chickens may congregate, and in which they may be protected from the wind and cold.

It also consists of a peculiarly-shaped chamber into which the heat is admitted and distributed from below to the plate or surface upon which the chickens may congregate, a covering to inclose the chamber, with suitable ventilating-spaces, and in certain details of construction, all of which will be more fully described by reference to the accompanying drawings, in which—

Figure 1 is a perspective view of my apparatus. Fig. 2 is a vertical section through the center. Fig. 3 is a plan of the top of the chamber.

A is a space or excavation made below the surface of the ground, of sufficient depth to receive the inverted pyramidal-shaped chamber B. The top C of this chamber forms the base of the pyramid, and rests upon the edges of the opening A, so as to be at or about on a level with the surface of the ground. The lower end or apex of the pyramid is cut off, so that it forms a frustum, and is left open, as shown, so that the chimney D of the lamp E may extend upward through the opening into the interior of the chamber B.

F is a plate which is secured just beneath top plate, C, and above the lamp-chimney D, so that the heat of the latter, striking upon this plate, may be distributed beneath all parts of the plate C. By this construction the heat being admitted through the narrow opening at the bottom will be distributed throughout the large upper portion of the chamber B, thus heating the enlarged surface C, while the narrow opening below prevents the heat escaping too rapidly from the chamber. In some cases it may be found desirable to make the chamber B with a double top, so as to form a chamber beneath the top C, into which water may be introduced and heated from the lamp below in the same manner as before described. This may be done in some cases for the purpose of securing a more even temperature; but I have found that the shape of the chamber herein described and the distributer for throwing the heat outward from the center produce very satisfactory results. When the water-chamber is used, a simple tube may be connected with it for the purpose of relieving it of any pressure or vapor, and it may also have suitable means for withdrawing and supplying water when necessary. When the surface C is made perfectly plain, the effect of the expansion or contraction upon it is apt to cause it to buckle or vibrate suddenly, and this causes such vibration of the air within the chamber B that it will sometimes put out the light. In order to overcome this, I have found that by indenting the surface C in lines across it or at right angles with each other I am able to prevent this vibration, and thus preserve the light from extinction. Above the table or surface C is a cover or inclosure, G, which may be made of any suitable material. I have found that a low wooden box having sides and top, as shown, and extending to a distance of some inches outside of the table or plate C, is very satisfactory. In the upper and central portion of this box is a fine screen or net, H, which serves for ventilation. One side of this box is sufficiently open to allow the chickens to enter and leave at will, and as the surface C is nearly or quite on a level with the ground the chickens may run in and out at will. By extending the sides of the box G sufficient space is produced to prevent the chickens from crowding each other, and if they become too warm they can scatter outward and away from the table without leaving shelter. This construction prevents undue crowding, and there is no chance of suffocating the chickens on this account.

In the ordinary construction of brooders, which are heated from above, and which have no such extension beyond the source of heat, the chickens will crowd against the sides and into the corners, and the weaker ones will be trampled to death. For this reason only a few chickens can be cared for in each brooder; but with my apparatus, heated from below, there is no tendency to crowd, as the chickens feeling the heat from below will crouch and distribute themselves upon the warm surface. As it is colder at the sides than it is upon the table, they are not inclined to crowd off into the corners, and the number that may be placed in one brooder is only limited by the size. The surface C may be covered with burlap or felt at first, and after the chickens have attained some age and strength it may be covered with a light layer of earth or sand. The pit or chamber A is extended beyond the rear and end of the cover G, so as to allow of openings or gratings I for the escape of foul air and products of combustion from the lamp, and as the brooder is set near one side or corner of the inclosure or otherwise protected the chickens cannot approach the grating. The chamber B may be easily removed at any time by simply lifting it out of the chamber A. Fresh air may enter freely at the open side of the brooder G, and is kept warm by radiant heat from the plate C, the circulation being insured by the ventilators at the top. By the employment of the inclosed chamber B, into which the heat from the lamp or other source passes, it does not escape readily, and therefore produces its fullest effect. The flame necessary is very small, and the apparatus is economical.

Having thus described my invention, what I claim as new, and desire to secure by Letters Patent, is—

1. A heating device for brooders for chickens, consisting of a pyramidal-shaped chamber having its base upward, and supported so as to be approximately level with the surrounding surface, and an opening in the apex through which heat is introduced, in combination with a distributer or plate above the heat-opening, substantially as herein described.

2. A heating device for brooders for chickens, consisting of an inverted pyramidal-shaped chamber, B, the base or top of which is a conductor of heat, means by which its base or upper side is supported, an intermediate water or air space beneath the upper surface or table, in combination with a heater, substantially as herein described.

3. A heating device for brooders for chickens, consisting of an inverted pyramidal-shaped chamber heated from below, and having an enlarged base or table with indented lines or corrugations, substantially as herein described.

4. A brooder for chickens, consisting of an inverted pyramidal-shaped chamber, with the base made of heat-conducting material having an opening in the apex below into which heat passes from a heater, in combination with an inclosure or chamber surrounding the upper surface, substantially as herein described.

In witness whereof I have set my hand.

GEORGE B. BAYLEY.

Witnesses:
S. H. NOURSE,
H. C. LEE.